Patented June 6, 1939

2,160,938

UNITED STATES PATENT OFFICE 2,160,938

POLYMERIZING VINYLIDENE HALIDES

John H. Reilly and Ralph M. Wiley, Midland, Mich., assignors to The Dow Chemical Company, Midland, Mich., a corporation of Michigan No Drawing. Application October 13, 1937, Serial No. 168,790

6 Claims. (Cl. 260—80)

This invention relates to the polymerization of vinylidene halides, i. e. vinylidene chloride, vinylidene bromide, and vinylidene cholorbromide, and mixtures thereof with other polymerizable materials.

In the polymerization of monomeric vinylidene halides, or of their mixtures with other polymerizable materials, they may be exposed to catalysts, usually in the presence of light, and frequently to elevated temperatures. The products thus obtained are polymeric bodies characterized by a sharp acidic odor and usually require purification before they are suitable for fabrication. The odor displayed by such polymers is that of the hydrogen halide, carbonyl halide, and/or halo-acetyl halide, corresponding to the halogen present in the polymerized compounds, i. e. in the polymerization of vinylidene chloride, hydrogen chloride, phosgene and/or chloro-acetyl chloride are ordinarily produced. Heating such polymeric bodies, in the presence of included acid materials, to temperatures above the softening point of the resin results in discoloration and decomposition.

An object of the invention is to provide a process whereby vinylidene halides can be polymerized either alone or conjointly with other polymerizable materials in such a manner that decomposition yielding hydrogen halides, carbonyl halides, or other acid-forming materials is avoided. A further object of the invention is to provide a process whereby substantially colorless and odor-free polymers and co-polymers of vinylidene halides can be produced.

We have now found that vinylidene halides can be polymerized either alone or in admixture with other polymerizable materials without the formation of acidic materials and with complete freedom from discoloration, by carrying out the polymerization reaction under a layer of, or in the presence of, certain liquids which are inert to the vinylidene halide. The liquid selected must be a solvent for hydrogen halides, carbonyl halides, and like decomposition products of the vinylidene halide, and, if immiscible with the vinylidene halide-containing mixture, have a specific gravity not appreciably greater than that of said mixture. Liquids fulfilling these requirements, which have been found to be satisfactory in the present invention, are all miscible with water, and do not prevent the polymerization of vinylidene halides. Suitable examples of such liquids are water, methyl alcohol, ethyl alcohol, ethylene glycol, glycerine, acetone, ethylene mono-acetate, and aqueous hydrochloric acid. The term "water-miscible inert liquids" hereinafter employed, refers to liquids of the type defined above. The presence of such liquids during the polymerization process accomplishes the desired result of maintaining the polymerized material in an acid-free condition.

The preferred liquids which we employ are water, ethylene glycol, glycerine, and aqueous hydrochloric acid. Of these, the first three appear to be equivalent in their effect on the polymerization of vinylidene halides, while aqueous hydrochloric acid appears to be more effective in accomplishing the desired results than the other members of the group. Polymerization appears to be more complete when hydrochloric acid is used than when other liquids are employed, the polymer being harder than those formed in other processes. When polymerization is carried out in the presence of hydrochloric acid, the temperature required to accomplish polymerization in a given length of time or the time required to arrive at the same state of polymerization at any given temperature is materially less than when the vinylidene halide is polymerized alone or in the presence of water, glycol, or glycerine.

Methyl and ethyl alcohols and acetone decrease the rate of polymerization of vinylidene halides to a slight extent, but when they are present in the polymerization mixture certain desirable results are obtained. These liquids affect the polymerization of vinylidene halides in such a manner that a solid polymeric mass is not obtained. The resin formed in the presence of methyl alcohol, ethyl alcohol, or acetone is found to be composed of many small granular, or globular particles of the polymeric product, rather than a single concrete mass such as is ordinarily formed. This type of product has the advantageous properties of being more readily adapted to molding operations and more readily dispersed to form colloidal suspensions of the polymers in certain dispersion media therefor.

Higher mono-hydric alcohols, such as propyl alcohol, butyl alcohol, amyl alcohol, etc., are not effective agents for the accomplishment of the object of the present invention, these materials having noticeable inhibiting effect on the polymerization of vinylidene halides. Aqueous ammonia and aqueous solutions of alkyl amines have been found to be unsatisfactory for the purposes of the present invention owing to the fact that these solutions inhibit polymerization of vinylidene halides and their mixtures with other polymerizable materials. It might have been expected that alkaline solutions of the type just mentioned should be particularly advantageous in removing acidic materials formed during the reaction or in preventing the formation of such materials during polymerization, but such is not the case.

When the liquid employed is immiscible with the monomeric vinylidene halide, as is the case with water, glycol, glycerine, and hydrochloric acid, only enough of such liquid is required to form a layer over the halide. When the liquid is acetone or an alcohol, miscible with vinylidene halide, it is desirable to employ a volume of the non-polymerizing liquid ordinarily equal to at least a third of the volume of the vinylidene halide-containing polymerizable liquid.

In a preferred mode of carrying out our invention a vinylidene halide, or mixture thereof with other polymerizable materials, is placed in a transparent vessel, suitably a glass bottle, and the halide is mixed with a water-miscible inert liquid. The material in the bottle is subjected to the desired temperature of polymerization, ordinarily in the range from room temperature to about 90° C., and to the action of light. Polymerization occurs quite rapidly, ordinarily being complete in from 2 to 7 days. The length of time required for polymerization appears to depend upon the conditions under which the monomeric vinylidene halide had previously been distilled and stored, and upon other, as yet undertermined, factors. Vinylidene halides appear to have a marked absorptive affinity for oxygen, and monomeric material distilled in the presence of air, or exposed to air for some time prior to polymerization, thereafter polymerize more completely than does material distilled in or stored in an oxygen-free atmosphere. The product remaining under the water-miscible inert liquid employed is substantially colorless. This liquid is decanted, the resinous product removed from the polymerization vessel and heated to drive off any remaining monomeric materials. The residual polymers or co-polymers are substantially colorless, free from acid odors, and are quite stable.

Polymerization can be carried out to obtain discrete particles of the solid polymer, if desired, by agitating the monomeric vinylidene halide with the water or water-miscible inert liquid employed, during the polymerization step.

The following examples illustrate the practice of our invention:

Example 1

700 grams of vinylidene chloride, boiling point 31.8° C., which had been allowed to stand exposed to the air for 3 hours after having been distilled, was mixed with 2.5 grams of benzoyl peroxide and 300 grams of hexachloro-diphenyl oxide. The mixture was placed in a 32-ounce glass bottle and was covered with 150 grams of water and placed in a constant temperature bath maintained at about 29° C. for 6 days. A solid resinous polymer was obtained which weighed 877 grams. The product had a pleasant, acid-free odor and was light colored. The water layer was substantially free from acid.

A like weight of an identical mixture, polymerized under the same conditions, but without water, yielded a solid resinous polymer weighing 792 grams. This product had a sharply acid odor like that of phosgene.

Example 2

317.5 grams (250 milliliters) of vinylidene chloride was placed in a 500-milliliter glass bottle and covered with 100 grams of water. The mixture in the bottle was allowed to stand at room temperature and was exposed to the action of diffused sunlight in the laboratory during daylight hours for a period of 4 days, at the end of which time the vinylidene chloride was completely polymerized. There was obtained about 310 grams of a light colored, acid-free, solid polymer. The water layer was substantially free from dissolved acids.

Example 3

A quantity of vinylidene chloride identical with that employed in Example 2 was covered with 100 milliliters of 30 percent hydrochloric acid solution and was polymerized under the same conditions as were employed in the foregoing example. Polymerization was complete after 3 days, at which time the product was a very dense, hornlike mass weighing approximately 310 grams after having been washed with water and dried. It had no acid odor.

Example 4

Ethylene glycol was substituted for the water employed in Example 2. After 4 days the ethylene glycol was still free from acid and the vinylidene chloride had been polymerized completely.

Example 5

Glycerine was substituted for ethylene glycol employed in Example 4, and at the end of 4 days polymerization of vinylidene chloride was found to be complete and the glycerine was found to be free from dissolved acids.

Example 6

317.5 grams of vinylidene chloride was mixed in a 500-milliliter bottle with 100 milliliters of 95 per cent ethyl alcohol. The mixture was polymerized under the same conditions of temperature and light as were employed in Example 2. At the end of 2 weeks the alcohol was still free from acid and was decanted from the completely polymerized vinylidene chloride. The polymer was found to be composed of many discrete, amorphous particles.

Example 7

Acetone was substituted for the ethyl alcohol employed in Example 6. Polymerization of the vinylidene chloride was complete in about 5 days. There were traces of acid present in the acetone at the end of this period, but not in sufficient quantity to be detected by their odor. The product was obtained in a finely divided form similar to that described in the foregoing example.

Example 8

To a mixture of 18 milliliters of vinylidene chloride and 2 milliliters of ethyl acrylate (10 per cent by volume) was added 0.12 gram of benzoyl peroxide as a catalyst. The mixture was covered with 5 milliliters of water in a one-ounce clear glass, tightly stoppered bottle. The sample was warmed to 30° C. and held at this temperature for 72 hours. The polymer obtained at the end of this time was a white powdery material having a softening point of 160° C. after being washed with acetone and dried. The was no evidence of any acidity in the sample while polymerization was being effected or after polymerization had been continued for the period indicated. When the polymer was warmed to a temperature of 180° C., cooled to room temperature, and coldworked, the co-polymer obtained was very tough and pliable.

The invention has been illustrated by reference to the polymerization of vinylidene chloride and its mixture with ethyl acrylate, but is equally applicable to the polymerization under similar conditions of other vinylidene halides, i. e. vinylidene bromide and vinylidene chlorobromide, and mixtures of these halides with other polymerizable materials including styrene, divinyl ether, vinyl chloride, methyl acrylate, methyl methacrylate, vinyl acetate, etc.

This application is a continuation-in-part of our co-pending application Serial Number 128,163, filed February 27, 1937.

Other modes of applying the principle of our invention may be employed rather than those explained, change being made as regards the method described, provided the step or steps stated in the following claims or the equivalent of such stated step or steps be employed.

We therefore particularly point out and distinctly claim as our invention:

1. The process which comprises polymerizing a material selected from the group consisting of vinylidene halides and mixtures thereof with materials co-polymerizable therewith, wherein the vinylidene halide predominates, in the presence of a water-miscible inert liquid.

2. The process which consists in subjecting a material selected from the group consisting of monomeric vinylidene halides and their mixtures with materials co-polymerizable therewith, wherein the vinylidene halide predominates, to a temperature in the range from room temperature to about 90° C. in the presence of light, and in the presence of a water-miscible inert liquid.

3. In a process for the polymerization of a vinylidene halide, the steps which consist in subjecting the monomeric vinylidene halide to a temperature in the range from room temperature to about 90° C. in the presence of light, and in the presence of a water-miscible inert liquid.

4. In a process for the polymerization of vinylidene chloride, the steps which consist in subjecting the monomeric vinylidene chloride to a temperature in the range from room temperature to about 90° C. in the presence of light and a water-miscible inert liquid.

5. The process which comprises polymerizing a vinylidene halide under aqueous hydrochloric acid.

6. The process which comprises polymerizing vinylidene chloride under aqueous hydrochloric acid.

JOHN H. REILLY.
RALPH M. WILEY.